(12) United States Patent
Frachon (10) Patent No.: US 9,116,018 B2
(45) Date of Patent: Aug. 25, 2015

(54) LINEAR OR ROTARY POSITION SENSOR WITH A PERMANENT MAGNET FOR DETECTING A FERROMAGNETIC TARGET

(75) Inventor: Didier Frachon, Besançon (FR)

(73) Assignee: MOVING MAGNET TECHNOLOGIES (MMT), Besançon (FR)

(*) Notice: Subject to any disclaimer, the term of this patent is extended or adjusted under 35 U.S.C. 154(b) by 1139 days.

(21) Appl. No.: 13/120,776

(22) PCT Filed: Sep. 9, 2009

(86) PCT No.: PCT/FR2009/001078
§ 371 (c)(1),
(2), (4) Date: May 19, 2011

(87) PCT Pub. No.: WO2010/034896
PCT Pub. Date: Apr. 1, 2010

(65) Prior Publication Data
US 2011/0267040 A1  Nov. 3, 2011

(30) Foreign Application Priority Data
Sep. 24, 2008 (FR) ........................... 08 05261

(51) Int. Cl.
*G01B 7/14* (2006.01)
*G01B 7/30* (2006.01)
*G01R 33/06* (2006.01)
(Continued)

(52) U.S. Cl.
CPC ...................................... *G01D 5/147* (2013.01)

(58) Field of Classification Search
CPC ............ G01B 7/14; G01B 7/30; G01R 33/06; H01L 43/06

USPC ............ 324/207.11, 207.24, 207.22, 207.25, 324/207.26, 174, 173, 11, 7 H, 117 R, 324/207.15
See application file for complete search history.

(56) References Cited

U.S. PATENT DOCUMENTS 3,061,771 A  10/1962 Planer et al.
4,785,242 A  11/1988 Vaidya et al.
(Continued)

FOREIGN PATENT DOCUMENTS

CN  101384883  3/2009
DE  102006051621  5/2008
(Continued)

*Primary Examiner* — Patrick Assouad
*Assistant Examiner* — Lamarr Brown
(74) *Attorney, Agent, or Firm* — Harness, Dickey & Pierce, P.L.C.

(57) ABSTRACT

The disclosure relates to a contactless magnetic sensor for measuring the angular or linear movement of a ferromagnetic target. The purpose of the disclosure is to make a position sensor having reduced dimensions and capable of detecting a piece of position information as soon as the sensor is powered without degrading the performance thereof. To this end, the disclosure relates to a mobile sensor that includes at least one permanent magnet, at least one ferromagnetic member at least one magnetically sensitive member, the permanent magnet having an upper surface opposite the ferromagnetic target, wherein the permanent magnet has a substantially cylindrical or parallelepiped shape and includes a cavity, the ferromagnetic member being arranged inside the cavity and the magnetically sensitive member being arranged inside the cavity above the ferromagnetic member and below the upper surface of the magnet.

27 Claims, 5 Drawing Sheets

(51) Int. Cl.
*H01L 43/06* (2006.01)
*G01D 5/14* (2006.01)

(56) References Cited

U.S. PATENT DOCUMENTS

| | | | |
|---|---|---|---|
| 4,966,041 A | 10/1990 | Miyazaki | |
| 5,070,298 A | 12/1991 | Honda et al. | |
| 5,159,268 A | 10/1992 | Wu | |
| 5,250,925 A | 10/1993 | Shinkle | |
| 5,351,387 A | 10/1994 | Iwata et al. | |
| 5,416,410 A | 5/1995 | Kastler | |
| 5,444,313 A | 8/1995 | Oudet | |
| 5,528,139 A | 6/1996 | Oudet et al. | |
| 5,532,585 A | 7/1996 | Oudet et al. | |
| 5,670,876 A | 9/1997 | Dilger et al. | |
| 5,781,005 A | 7/1998 | Vig et al. | |
| 5,814,985 A | 9/1998 | Oudet | |
| 5,894,264 A * | 4/1999 | Zimmermann | 340/388.1 |
| 5,942,895 A | 8/1999 | Popovic et al. | |
| 6,043,645 A | 3/2000 | Oudet et al. | |
| 6,043,646 A | 3/2000 | Jansseune | |
| 6,087,827 A | 7/2000 | Oudet | |
| 6,175,233 B1 * | 1/2001 | McCurley et al. | 324/207.2 |
| 6,219,212 B1 | 4/2001 | Gill et al. | |
| 6,304,078 B1 | 10/2001 | Jarrard et al. | |
| 6,326,781 B1 | 12/2001 | Kunde et al. | |
| 6,518,749 B1 | 2/2003 | Oudet et al. | |
| 6,545,463 B1 | 4/2003 | Dettmann et al. | |
| 6,573,709 B1 | 6/2003 | Gandel et al. | |
| 6,576,890 B2 | 6/2003 | Lin et al. | |
| 6,593,734 B1 | 7/2003 | Gandel et al. | |
| 6,922,052 B2 | 7/2005 | Steinruecken et al. | |
| 6,992,478 B2 | 1/2006 | Etherington et al. | |
| 7,028,545 B2 | 4/2006 | Gandel et al. | |
| 7,030,608 B2 | 4/2006 | Kawashima et al. | |
| 7,049,808 B2 | 5/2006 | Martinez et al. | |
| 7,088,096 B2 | 8/2006 | Etherington et al. | |
| 7,116,210 B2 | 10/2006 | Lawrence et al. | |
| 7,239,131 B2 | 7/2007 | Halder et al. | |
| 7,283,826 B2 * | 10/2007 | Dufour et al. | 455/456.1 |
| 7,304,450 B2 | 12/2007 | Prudham | |
| 7,501,929 B2 | 3/2009 | Lawrence et al. | |
| 7,589,445 B2 | 9/2009 | Gandel et al. | |
| 7,644,635 B2 | 1/2010 | Prudham et al. | |
| 7,741,839 B2 | 6/2010 | Jarrard | |
| 7,784,365 B2 | 8/2010 | Masson et al. | |
| 7,898,122 B2 | 3/2011 | Andrieux et al. | |
| 7,906,959 B2 | 3/2011 | Frachon et al. | |
| 8,183,857 B2 * | 5/2012 | Tanaka et al. | 324/207.2 |
| 2001/0045827 A1 * | 11/2001 | Shinjo et al. | 324/207.21 |
| 2002/0053903 A1 * | 5/2002 | Kempe | 324/207.25 |
| 2003/0048100 A1 * | 3/2003 | Genot et al. | 324/207.2 |
| 2003/0155909 A1 | 8/2003 | Steinruecken et al. | |
| 2004/0130314 A1 | 7/2004 | Bossoli et al. | |
| 2005/0099175 A1 * | 5/2005 | Barnabo et al. | 324/207.2 |
| 2005/0218727 A1 | 10/2005 | Gandel et al. | |
| 2006/0123903 A1 | 6/2006 | Gandel et al. | |
| 2006/0125473 A1 * | 6/2006 | Frachon et al. | 324/207.26 |
| 2007/0008063 A1 | 1/2007 | Lawrence et al. | |
| 2007/0090827 A1 | 4/2007 | Jarrard | |
| 2008/0250873 A1 | 10/2008 | Prudham et al. | |
| 2008/0278158 A1 * | 11/2008 | Granig et al. | 324/247 |
| 2008/0284261 A1 | 11/2008 | Andrieux et al. | |
| 2008/0314164 A1 | 12/2008 | Masson et al. | |
| 2009/0091312 A1 * | 4/2009 | Ito et al. | 324/207.2 |
| 2009/0284253 A1 * | 11/2009 | Finkler et al. | 324/207.2 |
| 2010/0045275 A1 | 2/2010 | Frachon | |
| 2010/0194385 A1 | 8/2010 | Ronnat et al. | |
| 2010/0231205 A1 | 9/2010 | Jerance et al. | |
| 2010/0253324 A1 | 10/2010 | Jarrard | |
| 2011/0043194 A1 | 2/2011 | Frachon et al. | |

FOREIGN PATENT DOCUMENTS

| | | |
|---|---|---|
| EP | 0 273 481 | 7/1988 |
| EP | 0 665 416 | 8/1995 |
| EP | 1 014 039 | 6/2000 |
| EP | 1 477 772 | 11/2004 |
| FR | 2 670 286 | 6/1992 |
| FR | 2 724 722 | 3/1996 |
| FR | 2 764 372 | 12/1998 |
| FR | 2 790 549 | 9/2000 |
| FR | 2 809 808 | 12/2001 |
| FR | 2 845 469 | 4/2004 |
| FR | 2 893 410 | 5/2007 |
| FR | 2 898 189 | 9/2007 |
| FR | 2 919 385 | 1/2009 |
| KR | 2008-0077369 | 8/2008 |
| KR | 2008-0104048 | 11/2008 |
| WO | WO 2007/057563 | 5/2007 |
| WO | WO 2007/099238 | 9/2007 |
| WO | WO 2009/101270 | 8/2009 |

* cited by examiner

LINEAR OR ROTARY POSITION SENSOR WITH A PERMANENT MAGNET FOR DETECTING A FERROMAGNETIC TARGET

CROSS-REFERENCE TO RELATED APPLICATIONS

This application is a National Phase Entry of International Application No. PCT/FR2009/001078, filed on Sep. 9, 2009, which claims priority to French Patent Application Serial No. 08/05261, filed on Sep. 24, 2008, both of which are incorporated by reference herein.

TECHNICAL FIELD OF THE INVENTION

The present invention relates to the field of contactless magnetic position sensors (linear or rotary) comprising at least one permanent magnet and at least one member for measuring the magnetic field sensitive to the amplitude and/or the direction of the magnetic field. More particularly, the invention relates to sensors used for determining the presence of a moving ferromagnetic piece (digital sensor) or its linear or angular (analog sensor) position.

BACKGROUND

The magnetic sensors (digital and analog) of linear or angular position have many advantages:
  no mechanical contact with the mobile portion, and hence no wear,
  insensitivity to dirt,
  reduced production cost,
  long service life.

Magnetic sensors used for determining the position and/or the velocity of a ferromagnetic piece (piece exhibiting teeth on its periphery) are typically used in the automobile industry in order to know the position/velocity of the camshaft with the purpose of controlling the electronic ignition of the motor.

Most contactless magnetic digital position sensors use cylindrical-shaped permanent magnets axially-magnetized associated to several magnetically sensitive members (differential probe) with the aim of eliminating the average magnetic flux density detected by the probes. In fact, given the shape of the magnet, the induction detected by a probe is very high and hence very sensitive to the variations of the magnet magnetic properties along with temperature variations. The calculation of the induction difference between the two magnetically sensitive members makes it possible to cancel the average magnetic flux density but on the other hand it becomes difficult to know the position of the member to detect at the starting of the system. The use of several magnetically sensitive members also induces a more important cost and a higher global volume of the sensor.

There also exists systems which use a substantially cylindrical permanent magnet, comprising a cavity, associated to one single magnetically sensitive member. The magnet comprising a cavity makes it possible to reduce the average magnetic flux density at the magnetically sensitive member and hence the use of one single magnetically sensitive member. These systems also make it possible to know the position of the member to detect as soon as the sensor is started-up.

The current trend for this type of sensor is to have even smaller sensors without however losing the level of performance. The two types of systems described above do not allow for an appreciable reduction in size without compromising performance. Moreover, the distance between the member to detect (target) and the sensor is also more important and it is necessary to guarantee performance, this can only be done by an increase in the variation of the magnetic induction at the magnetically sensitive member according to the target position.

It is known, in the state of the art, patent FR2724722 of the applicant and U.S. Pat. No. 6,043,646 which describe a digital position/velocity sensor with a substantially cylindrical permanent magnet using one single magnetically sensitive member. The systems described make it possible to obtain at the magnetically sensitive member a average magnetic flux density very close to 0 G, however a decrease in size of the magnet leads to a decrease in the sensor sensitivity and hence a decrease in performance.

There is also known U.S. Pat. No. 5,781,005 describing a digital position sensor used for detecting a ferromagnetic piece which exhibits a plurality of teeth. This sensor uses two permanent magnets magnetized in a same direction and stuck to a ferromagnetic plate. A Hall effect probe placed above this assembly, between the target and the magnet, measures the variation of magnetic induction in a direction parallel to the magnetization. The magnetically sensitive member of the probe being placed in proximity to the target. With such a system, it is difficult to have an average magnetic flux density close to 0 G and a decrease in the external diameter leads to a decrease in performance.

There is also known in the state of the art, patent FR2845469 of the applicant, which describes a linear or rotary position analog sensor. This analog sensor measures the position of a moving ferromagnetic piece (linear or rotary) by means of the induction variation generated by the variation of reluctance between a ferromagnetic piece and a permanent magnet, the induction variation being measured by a Hall effect probe. The downfall of this system is that the decrease in size of the sensor which comprises the magnet and the probe leads to a decrease in performance and a difficulty to work with an average magnetic flux density at the Hall effect probe close to 0 Gauss.

SUMMARY

The present invention proposes to remedy to the drawbacks of the state of the art by achieving a position sensor of reduced dimensions capable of detecting a piece of position information as soon as the sensor is powered without degrading the performance thereof. To this end, the invention proposes to use a substantially parallelepiped or cylindrical-shaped permanent magnet comprising a cavity wherein is inserted at least the magnetically sensitive member and a substantially cone-shaped ferromagnetic piece. To this end, the invention relates to a contactless magnetic sensor capable of measuring the angular or linear movement of at least one mobile ferromagnetic target (4), comprising at least one permanent magnet (1), at least one ferromagnetic member (2) and at least one magnetically sensitive member (3), the permanent magnet having an upper surface opposite the ferromagnetic target (4), wherein the permanent magnet (1) has a substantially cylindrical or parallelepiped shape and comprises a cavity (5), the ferromagnetic member (2) being arranged inside the cavity (5) and the magnetically sensitive member being arranged inside the cavity (5) above the ferromagnetic member (2) and below the upper surface of the magnet (1). This sensor is capable, in a reduced volume to achieve equal or even higher performances than current sensors. According to a non limitative alternative, the permanent magnet will be a cylindrical U-shape and magnetized substantially axially.

Preferably, a truncated conical ferromagnetic piece will be arranged inside the cavity of the permanent magnet. The base of this conical piece will be fixed onto the horizontal portion of the U-shape of the permanent magnet. The purpose of this ferromagnetic piece is to channel the field lines generated by the magnet towards the magnetically sensitive member/members and create a region of low magnetic flux density when the sensor is not in presence of the target to detect. The shape of the truncated cone of the ferromagnetic piece is not limitative, for example a rectangular-based truncated pyramid may also be considered.

Preferably, the magnetically sensitive member will be arranged above the truncated portion of the ferromagnetic cone in a region of average magnetic flux density close to 0 G and will measure the axial component of the magnetic field nearest to the narrowest portion of the truncated ferromagnetic cone. Practically, the magnetically sensitive members (Hall effect probe, AMR, GMR . . . ) are usually available encapsulated in a plastic casing. Thus, it becomes impossible to place the magnetically sensitive member in contact with the ferromagnetic member however, the casing containing the magnetically sensitive member will be positioned such as to minimize the distance between the ferromagnetic piece and the magnetically sensitive member.

Preferably, the vertical portions of the permanent magnet U-shape rise up on both sides of the magnetically sensitive member and as near as possible to the target to detect. Preferably, the magnetically sensitive member will be a simple switch-type Hall effect probe with a set threshold near to 0 G. In an alternative, the magnetically sensitive member will be a switch type Hall effect probe with programmable threshold. In another alternative, the magnetically sensitive member is a linear and programmable Hall effect probe. In another alternative, the magnetically sensitive member arranged in the cavity will be sensitive to the magnetic field direction.

The presented invention has several advantages with respect to the prior art solutions:
- with the same performance the possibility to reduce the size of the sensor,
- lower magnet volume and hence a lower manufacturing cost,
- increased performance in terms of working air gap, possibility to work with a more important target/magnet air gap by maintaining high performance,
- use of a simple Hall effect probe, thus economical.

One of the advantages of this invention is first of all that the volume reduction makes it possible to maintain high performance while having an economical advantage due to the fact that the magnet volume for operating the sensor is reduced. For manufacturing reasons, the base of the ferromagnetic piece may be directly over-molded into the magnet, thus allowing to reinforce the mechanical hold of the assembly. The shape of the magnet is simple and is compatible with the methods of producing used for manufacturing permanent magnets. Ferrite-based magnets, NBFeB or SmCo for example may be used with various manufacturing methods such as injecting, pressing and sintering.

BRIEF DESCRIPTION OF THE DRAWINGS

The invention will be better understood upon reading the description and the following figures.

DETAILED DESCRIPTION OF AN EMBODIMENT

Figure 1A:
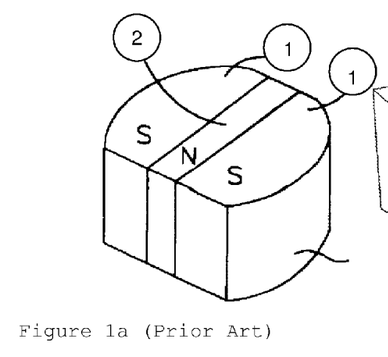
FIGS. 1a to 1d represent several structures from the prior art (in the following order U.S. Pat. No. 5,781,005, FR2845469, FR2724722, U.S. Pat. No. 6,043,646), exhibiting a ferromagnetic piece inserted between two axially-magnetized magnets and two structures comprising a magnet with a cavity.

FIGS. 1a to 1d represent four structures of digital sensors belonging to the prior art. FIG. 1a exhibits a sandwich of two permanent magnets 1 and a ferromagnetic piece 2 in the shape of a sheet. Above this assembly is arranged a Hall effect probe 3 measuring the induction variation according to the position of the target to detect.

Figure 1B:
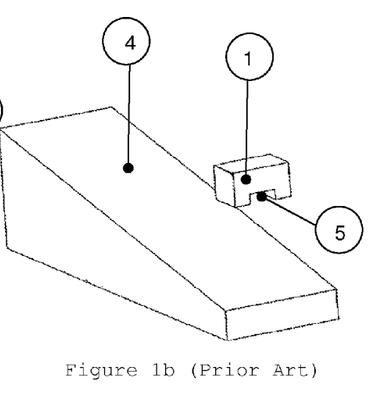
Figure 1C:
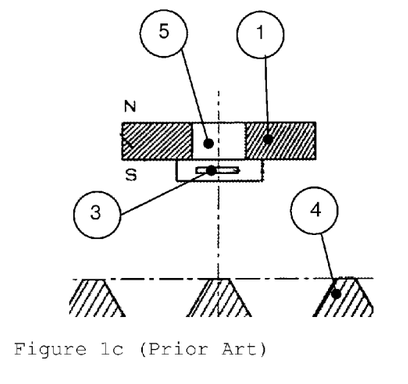
Figure 1D:
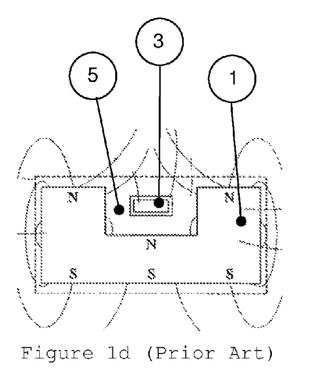

FIGS. 1b and 1d exhibit a magnet 1 with a cavity 5 wherein is arranged a magnetically sensitive probe 3. FIG. 1 c exhibits a magnet 1 with a through cavity 5. The probe 3 is placed in front of this magnet 1 between the magnet 1 and ferromagnetic piece or target 4 to detect.

Figure 2:
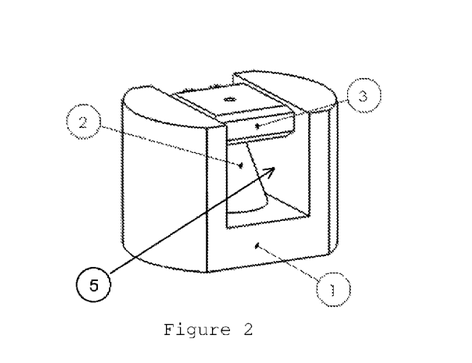
FIG. 2 represents the preferential configuration of the present invention.

FIG. 2 represents a U-shaped magnet 1 with a magnetization whereof the direction is substantially oriented according its axis. Within the cavity 5 of the U-shaped magnet, a ferromagnetic piece 2 is set in truncated conical shape whereof the base is pressed against the horizontal portion of the U shape. Above this ferromagnetic piece is arranged a Hall effect probe 3, whereof the magnetically sensitive member is positioned as close as possible to the upper portion of the ferromagnetic piece. The height of the cone is such that it leaves a space sufficient for inserting the probe between the cone and the upper portion of the magnet in order to avoid increasing the distance between the sensor and the ferromagnetic target to detect.

Figure 3:
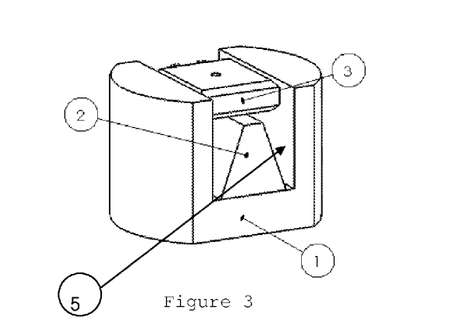
FIG. 3 represents an alternative configuration of the present invention.

FIG. 3 represents an alternative of the present invention wherein there is a U-shaped magnet 1 having a magnetization whereof the direction is substantially oriented according to its axis. Inside the cavity 5 of the U-shaped magnet is arranged a truncated cone-shaped ferromagnetic piece 2 whereof the base is pressed against the horizontal portion of the U shape. The base of this ferromagnetic piece is rectangular. Above this ferromagnetic piece is arranged a Hall effect probe 3 whereof the magnetically sensitive member is positioned at the closest to the upper portion of the ferromagnetic piece. The height of the cone is such that it leaves sufficient space for inserting the probe between the cone and the upper portion of the magnet in order to avoid increasing the distance between the sensor and the ferromagnetic piece to detect.

Figure 4:
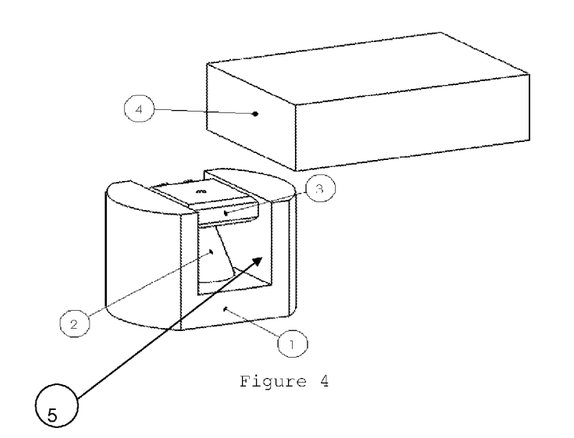
FIG. 4 represents the sensor according to the present invention associated to a rectangular target having a travelling movement.

FIG. 4 represents the sensor according to the present invention as well as a ferromagnetic piece 4 that is necessary to detect, parallelepiped ferromagnetic piece which exhibits a linear movement. The movement of the ferromagnetic piece may be carried out according to two directions:

either a transversal movement of the target in a substantially parallel plane to the upper side of the permanent magnet;

or a movement of the target (moving away or getting close) in a perpendicular plane to the upper face of the permanent magnet.

Figure 5:
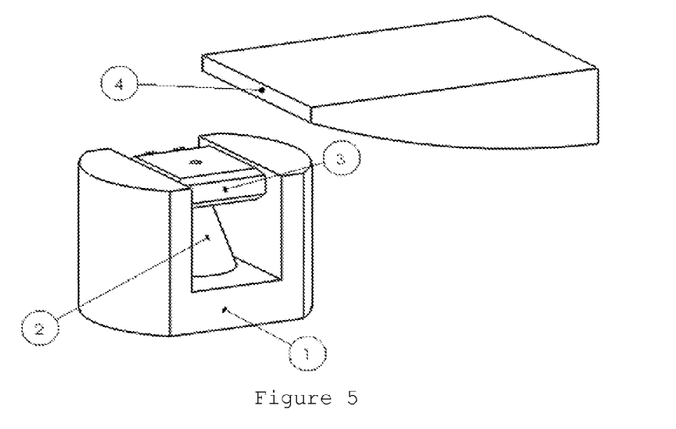
FIG. 5 represents an analog alternative of the sensor according to the present invention associated to a target with a varying profile having a travelling movement.

FIG. 5 represents a linear position analog sensor according to the present invention. The sensor is constituted by a substantially axially magnetized permanent magnet 1, a ferromagnetic piece 2 and a magnetically sensitive member 3. This sensor is associated to a ferromagnetic target 4 with a variable profile moving transversally with respect to the sensor, this profile thus defines a variable air gap between the sensor and said target making it possible to obtain an induction variation at the magnetically sensitive member according to a predefined linear or non linear function of the target linear position. The target profile may be adjusted in order to obtain an induction variation according to any monotone or continuous function.

Figure 6:
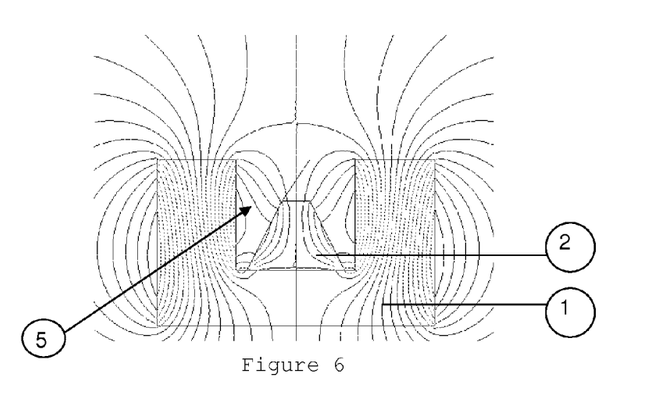
FIG. 6 represents the field lines in the system with solely the magnet.
Figure 7:
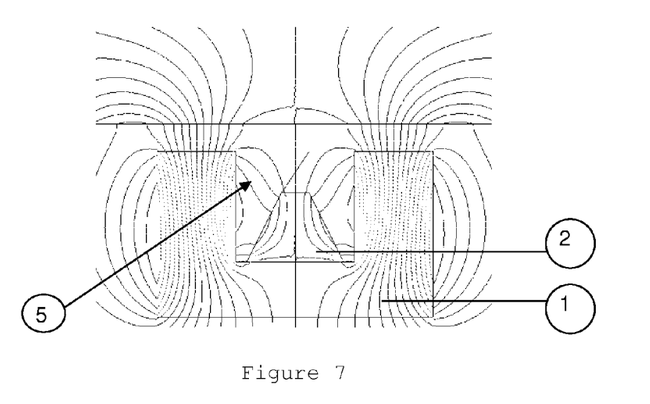
FIG. 7 represents the field lines in the system with the magnet and to target to detect.

FIG. 6 represents the field lines generated in the structure of the present invention. The conical ferromagnetic piece makes it possible to attain a magnetic induction level close to 0 G at the magnetically sensitive member as this conical piece makes it possible to attract and concentrate the field lines at the magnetically sensitive member. FIG. 7 represents the field lines generated in the structure of the present invention in presence of the ferromagnetic target to detect.

Figure 8:
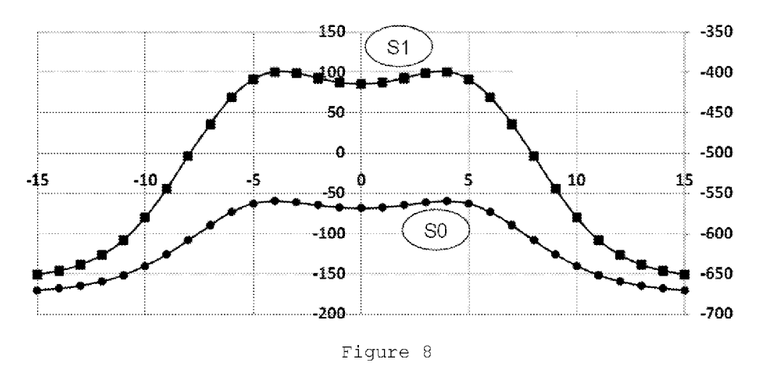
FIG. 8 represents the induction variation, at the Hall effect member, measured by the sensor of the present invention according to the longitudinal position of the target to detect; this signal variation is compared to the induction variation in the case of the structure of the prior art.

FIG. 8 represents the magnetic induction variation detected by the magnetically sensitive member according to the linear position of the target to detect (see FIG. 4). On this same curve is represented the signal for the sensor according o the present invention $S_1$, and the signal for the structure of the prior art $S_0$. In presence of the target (central part of the curve) the induction level is high and when the target is no longer opposite the sensor the induction level decreases to reach a minimum. For a global equivalent size, the present invention makes it possible to reach an induction modulation (signal opposite the target—signal without target) which is noticeably higher than that obtained with the structure of the prior art.

Figure 9:
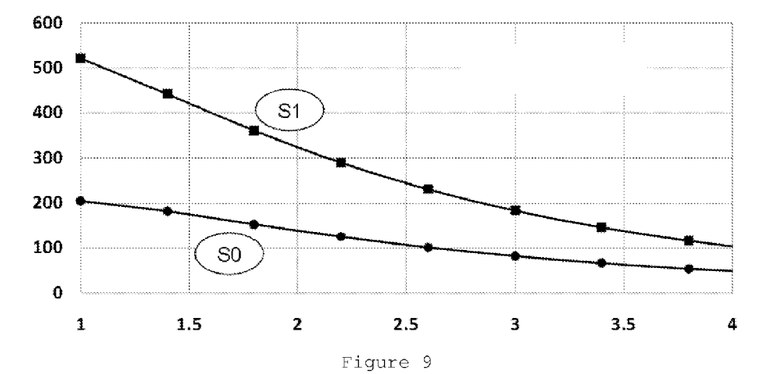
FIG. 9 represents the variation of the flux density according to the measuring air gap for the structure of the present invention and the structure of the prior art.

FIG. 9 exhibits a comparison of the induction modulation (sensor induction opposite the target less sensor induction without target) for the structure of the present invention and the structure of the prior art according to the distance between the sensor and the target to detect. In the same manner as previously, the signal for the sensor according to the present invention $S_1$ and the signal for the structure of the prior art $S_0$. Whatever the target-sensor distance the present invention brings a clear advantage pertaining to induction modulation. This parameter being determining for the performance of the sensor as it determines the capacity to work with an important target-sensor air gap and for a same air gap it increases the signal to noise ratio and the precision about the target detection.

Figure 10:
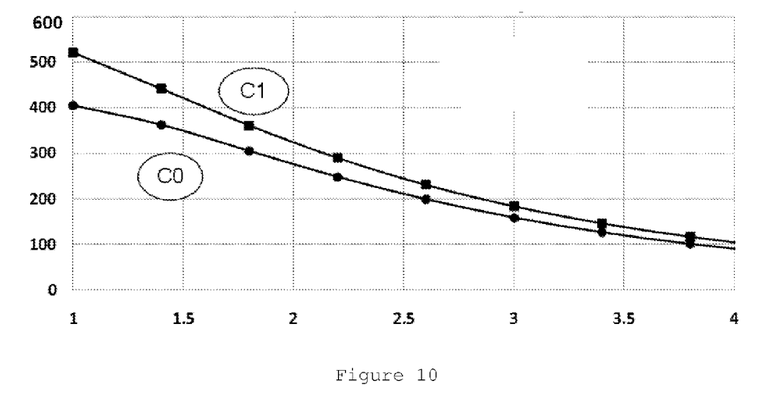
FIG. 10 represents the variation of the flux density according to the measuring air gap for different positions of the Hall effect member.

FIG. 10 represents for the present invention the variation of the induction modulation according to the position of the magnetically sensitive member with respect to the summit of the magnet. The curve C1 represents the induction modulation according to sensor-target distance (modulation =induction difference at the magnetically sensitive member in presence and without the target) for a distance between the summit of the cone and the magnetically sensitive member equal to 0.5 mm and the curve C2 represents the induction modulation for a distance between the summit of the cone and the magnetically sensitive member equal to 1 mm. The closer the magnetically sensitive member is to the summit of the ferromagnetic cone, the more important the induction modulation is, the limit obviously being when the magnetically sensitive member touches the summit of the cone which is in reality impossible because of the casing surrounding the magnetically sensitive member which requires that there be a minimum distance.

Figure 11:
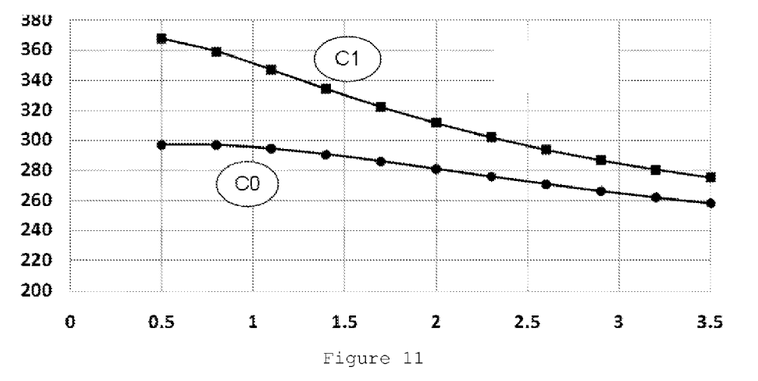
FIG. 11 represents the variation of the flux density according to the shape of the cone for different positions of the Hall effect member.

FIG. 11 represents the variation of the induction modulation according to the radius of the cone summit for two positions of the magnetically sensitive member, the radius of the base of the cone being stationary. The curve C1 represents the induction modulation according to the radius of the cone summit for a distance between the summit of the cone and the magnetically sensitive member equal to 0.5 mm and the curve C2 represents the induction modulation according to the radius of the cone summit for a distance between the cone summit and the magnetically sensitive member equal to 1 mm.

The conical shape of the ferromagnetic piece makes it possible to increase the induction modulation, in fact the finer the tip the higher the modulation. However, one must take into account the tolerance regarding the magnetically sensitive member positioning, in fact, the finer the tip of the cone, the more one will be sensitive to a positioning deviation of the magnetically sensitive member.

The invention claimed is:

1. A contactless magnetic sensor capable of measuring angular or linear movement of at least one mobile ferromagnetic target, the magnetic sensor comprising at least one permanent magnet, at least one ferromagnetic member and at least one magnetically sensitive member, the permanent magnet having an upper surface opposing the ferromagnetic target, the permanent magnet including a shape that is one of: substantially cylindrical and parallelepiped, and further including a cavity, the ferromagnetic member being arranged inside the cavity and the magnetically sensitive member being arranged inside the cavity above the ferromagnetic member and below the upper surface of the permanent magnet.

2. The magnetic sensor of claim 1, wherein the ferromagnetic member has a truncated conical shape.

3. The magnetic sensor of claim 1, wherein the ferromagnetic member has a trapezoid based-cylindrical shape.

4. The magnetic sensor of claim 1, wherein the magnet exhibits a substantially perpendicular magnetization at its base.

5. The magnetic sensor of claim 1, wherein the magnetically sensitive member measures an amplitude of the magnetic field.

6. The magnetic sensor of claim 1, wherein the magnetically sensitive member measures a direction of the magnetic field.

7. The magnetic sensor of claim 1, wherein the magnetically sensitive member is closest as possible to the ferromagnetic member.

8. The magnetic sensor of claim 1, wherein the magnetically sensitive member is a Hall effect member.

9. The magnetic sensor of claim 1, wherein the ferromagnetic target is mobile in a plane that is perpendicular to a magnetization direction.

10. The magnetic sensor of claim 1, wherein the ferromagnetic target is mobile in a plane that is parallel to a magnetization direction.

11. The magnetic sensor of claim 9, wherein the ferromagnetic target is mobile around an axis that is parallel to the magnetization direction.

12. The magnetic sensor of claim 10, wherein the ferromagnetic target is mobile around an axis that is perpendicular to the magnetization direction.

13. The magnetic sensor of claim 1, wherein the magnetically sensitive member is arranged in a zone where an average magnetic flux density according to a magnetization direction is close to 0 Gauss.

14. The magnetic sensor of claim 13, wherein the magnetically sensitive member is associated to an electronic circuit for processing a signal that has a threshold set close to 0 Gauss.

15. A contactless magnetic sensor capable of measuring angular or linear movement of at least one mobile ferromagnetic target, the magnetic sensor comprising:
   at least one permanent magnet;
   at least one ferromagnetic member;
   at least one magnetically sensitive member;
   the permanent magnet having an upper surface opposing the ferromagnetic target;
   the permanent magnet including a shape that is one of: substantially cylindrical and parallelepiped and further including a cavity;
   the ferromagnetic member having one of: a truncated conical shape and a trapezoid based-cylindrical shape;
   the ferromagnetic member being arranged inside the cavity; and
   the magnetically sensitive member being arranged inside the cavity above the ferromagnetic member and below the upper surface of the permanent magnet.

16. The magnetic sensor of claim 15, wherein the ferromagnetic target is mobile in a plane that is perpendicular to a magnetization direction.

17. The magnetic sensor of claim 15, wherein the ferromagnetic target is mobile in a plane that is parallel to a magnetization direction.

18. A magnetic sensor comprising:
   a permanent magnet having a base and pair of protrusions, the pair of protrusions extending from the base and terminating at a distal surface of the permanent magnet;
   a cavity defined by the permanent magnet between the pair of protrusions that is bounded by the pair of protrusions and the base and that is open at the distal surface of the permanent magnet;
   a ferromagnetic member disposed within the cavity adjacent the base and between the pair of protrusions; and
   a magnetically sensitive member disposed within the cavity between the pair of protrusions and between the ferromagnetic member and the distal surface such that the magnetically sensitive member is inward of the distal surface of the permanent magnet.

19. The magnetic sensor of claim 18, wherein the combination of the permanent magnet, cavity, ferromagnetic member, and magnetically sensitive member detects movement of a ferromagnetic target.

20. The magnetic sensor of claim 19, wherein the distal surface of the permanent magnet opposes the ferromagnetic target.

21. The magnetic sensor of claim 1, wherein the ferromagnetic member is fixed to the permanent magnet.

22. The magnetic sensor of claim 21, wherein the permanent magnet includes a horizontal portion and a pair of opposing vertical portions that extend from the horizontal portion, the horizontal portion and the vertical portions cooperating to form the cavity.

23. The magnetic sensor of claim 22, wherein the ferromagnetic member is fixed to the horizontal portion of the permanent magnet.

24. The magnetic sensor of claim 15, wherein the ferromagnetic member is fixed to the permanent magnet.

25. The magnetic sensor of claim 24, wherein the permanent magnet includes a horizontal portion and a pair of opposing vertical portions that extend from the horizontal portion, the horizontal portion and the vertical portions cooperating to form the cavity.

26. The magnetic sensor of claim 25, wherein the ferromagnetic member is fixed to the horizontal portion of the permanent magnet.

27. The magnetic sensor of claim 18, wherein the ferromagnetic member is fixed to the base of the permanent magnet.

* * * * *